Figure 1:
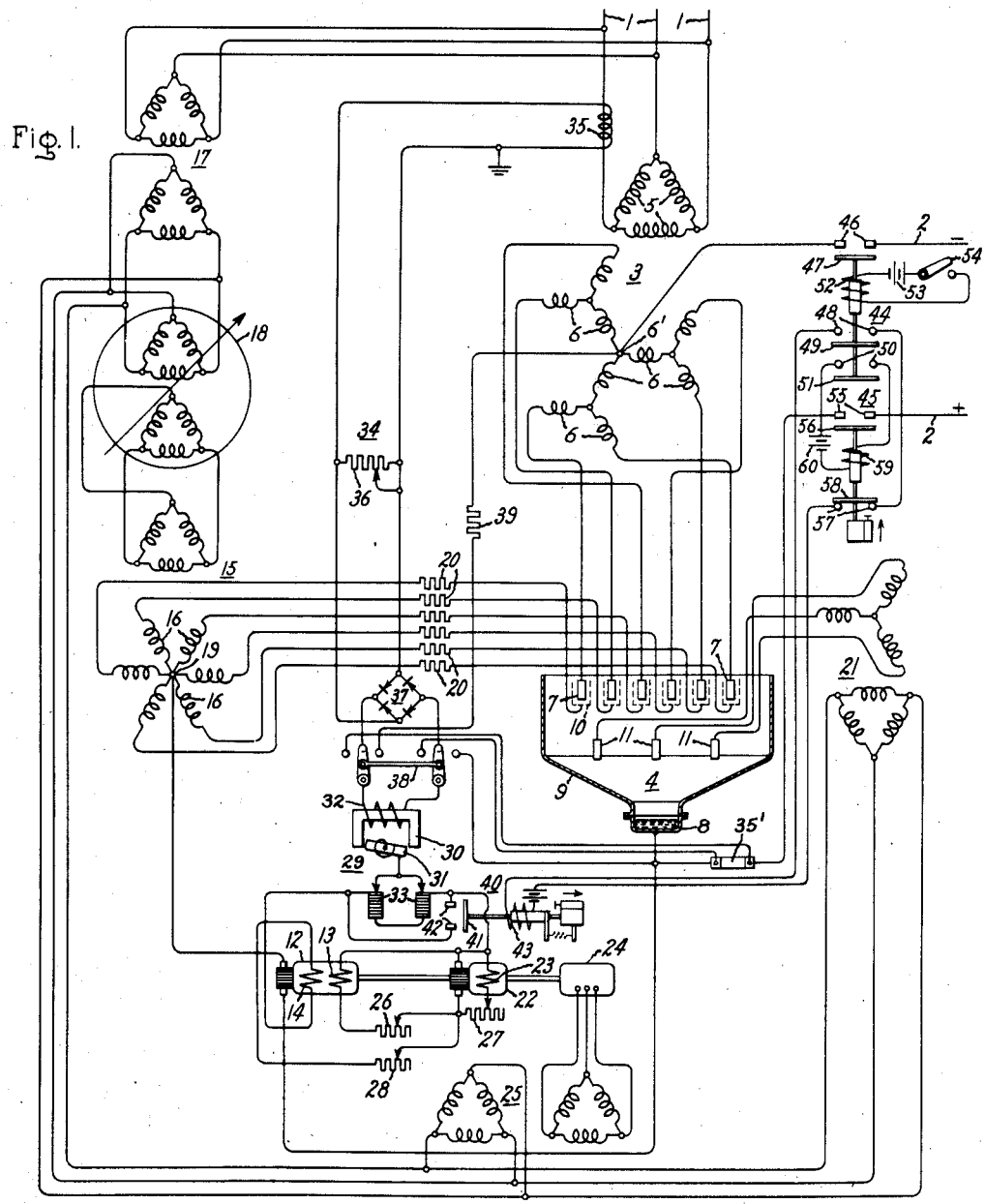

April 9, 1940.  E. S. JOHNSON ET AL  2,196,811
ELECTRIC VALVE CIRCUIT
Filed March 23, 1938

Inventors:
Earl S. Johnson,
James R. Kilander,
Eugene H. Reid,
by Harry E. Dunham
Their Attorney.

Patented Apr. 9, 1940

2,196,811

UNITED STATES PATENT OFFICE 2,196,811

ELECTRIC VALVE CIRCUIT

Earl S. Johnson, Erie, Pa., and James R. Kilander and Eugene H. Reid, Schenectady, N. Y., assignors to General Electric Company, a corporation of New York Application March 23, 1938, Serial No. 197,654

8 Claims. (Cl. 175—363)

Our invention relates to electric translating apparatus and more particularly to control circuits for electric valve apparatus.

In the control of electric translating apparatus employing electric valve means, it is frequently desirable to decrease the conductivity of the electric valve means during a starting operation so that the current increases gradually. There has been evidenced a need for improved control or excitation circuits for electric valves employing control members whereby the conductivity of the electric valve is reduced when the apparatus is connected to an associated load circuit. Furthermore, it is frequently important to provide overload protective means for the electric valve apparatus to maintain the current transmitted thereby within a safe range of operating values. Where the electric valves are of the type employing control members which control the conductivities of the valves, the current transmitted thereby may be maintained within a safe range of values by the proper energization of the control members. Many of the prior art arrangements which have controlled electric valves of this type have employed control circuits which are complicated in construction and arrangement and which have involved the use of a plurality of sources of voltage as well as numerous contactor or relay devices to obtain the selective energization of the control members under the various load conditions. In accordance with our invention, we provide an improved control system for electric valve apparatus which is reliable and relatively simple in construction and operation and which obviates the disadvantages of the prior art arrangements.

It is an object of our invention to provide a new and improved electric valve translating system.

It is another object of our invention to provide a new and improved control or excitation circuit for electric valve translating apparatus of the type employing control members.

It is a further object of our invention to provide a new and improved apparatus for connecting electric valve translating apparatus to an associated load circuit.

In accordance with the illustrated embodiment of our invention, we provide a new and improved control or excitation circuit for electric valve translating apparatus which controls the rate of build-up of current through the apparatus when it is connected to an associated load circuit. Circuit controlling means, such as switching apparatus, is employed to connect the translating apparatus to an associated load circuit. The excitation circuit comprises a source of voltage the polarity of which may be reversed, such as a direct current generator having two opposing field windings which energize control members of the electric valve means. An inductive network impresses an alternating voltage on the control member of the electric valve means and the alternating voltage lags the anode-cathode voltage of the electric valve means by a predetermined angle. One of the field windings of the direct current generator is energized at a substantially constant value; the other field winding is variably energized and controls the resultant excitation of the generator so that the voltage thereof may be varied throughout a range extending from a predetermined negative value to a predetermined positive value. The resultant voltage impressed on the control members of the electric valves is a voltage which is the resultant of the alternating voltage and the output voltage of the direct current generator. A regulator is connected in circuit with the second field winding of the generator to control the resultant excitation of the generator in accordance with an electrical condition such as the voltage of the load circuit. The regulator may also be employed to act as a current limiting device to maintain the load current at a substantially constant value when the power transfer tends to exceed a certain value.

Another feature of our invention concerns the control of the rate at which current builds up through the eelctric translating apparatus when the apparatus is connected to the load circuit. The switching means initiates an operation to control the excitation of the generator so that its terminal voltage is increased to a relatively large negative value for a predetermined time, thereby affording ample opportunity for the current to increase at a safe rate.

Figure 2:
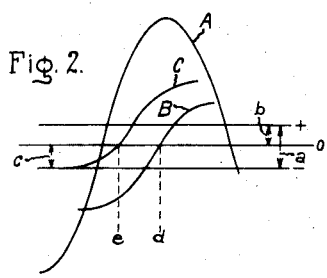

For a better understanding of our invention, reference may be had to the following description taken in connection with the accompanying drawing and its scope will be pointed out in the appended claims. Fig. 1 of the accompanying drawing diagrammatically illustrates an embodiment of our invention as applied to an electric valve translating system for transmitting energy from a three phase alternating current circuit to a direct current load circuit, and Fig. 2 represents certain operating characteristics thereof.

Referring now to Fig. 1 of the accompanying drawing, our invention is diagrammatically illustrated as applied to an electric valve system for transmitting energy from a polyphase alternating current circuit 1 to a direct current load circuit 2 through a transformer 3 and an electric valve means 4. The transformer 3 may have primary windings 5 and secondary windings 6 arranged to provide a neutral connection 6'. Electric valve means 4 may be of the type employing an ionizable medium and having a plurality of anodes 7 and a single cathode 8 within an enclosing receptacle 9. It is to be understood that, if desired, we may employ a plurality of individual electric valve means employing an ionizable medium and each comprising an anode, a cathode and a control member within an enclosing envelope or receptacle. Control members or grids 10 are associated with each of the anodes 7 and serve to control the conductivities of the various arc discharge paths afforded by the electric valve means 4. The electric valve means 4 may also have a plurality of holding anodes 11 which maintain the ionizable medium of the electric valve means in an ionized state.

We provide an excitation system for energizing the control members 10 to control the conductivities of the electric valve means 4. The excitation system includes a source of reversible polarity voltage, such as a generator 12 of the direct current type which may include a pair of opposing field windings 13 and 14. The winding 13 is energized to excite the generator 12 so that a positive biasing potential is impressed on the control members 10, and the winding 14 is designed to be substantially stronger than the winding 13, so that the effect of the latter may be overcome to control the resultant excitation of the generator 12 to impress a negative biasing potential on the control members 10. The output or armature voltage of the generator 12 is impressed on the control members 10 of electric valve means 4 through secondary windings 16 of a transformer 15 which is energized from the alternating current circuit 1 through a transformer 17 and a suitable phase shifting arrangement such as a rotary phase shifter 18. Secondary windings 16 of transformer 15 are arranged to provide a neutral connection 19 which is connected to one of the armature connections of the generator 12, and the other armature connection is connected to cathode 8 of the electric valve means 4. Current limiting resistances 20 are connected in series relation with control members 10. Holding anodes 11 of the electric valve means 4 may be energized from the alternating current circuit 1 through transformer 17 and a transformer 21.

As an agency for energizing the field windings 13 and 14 of generator 12, we provide any suitable direct current source such as an auxiliary generator or exciter 22 having a field winding 23. The generator 12 and the exciter 22 may be driven by a suitable means, such as an induction motor 24, which is energized from the alternating current circuit 1 through transformer 17 and a transformer 25.

Field winding 13 of generator 12 is connected to be energized from the exciter 22 and is preferably supplied with unidirectional current of constant value through an adjustable resistance 26. An adjustable resistance 27 may be connected in series relation with the field winding 23 of generator 22 which is self-excited. To adjust the energization of field winding 14 of generator 12 and hence to adjust the voltage of generator 12, we provide a suitable current controlling means such as an adjustable resistance 28 connected in series relation with the armature of exciter 22 and field winding 14.

To effect control of the polarity of the output voltage of generator 12, and to control the magnitude of the output voltage of generator 12, we provide a suitable current controlling means such as a rheostatic regulator 29 which may be connected in series relation with field winding 14. The rheostatic regulator 29 may comprise a core structure 30, an armature 31 which may be spring biased, an actuating coil 32 and variable impedance or resistance elements 33 which are controlled by the armature 31. The regulator 29 controls the current transmitted to field winding 14 and hence controls the excitation of the generator 12.

Where it is desired to maintain the current transmitted by the electric valve means 4 at a substantially constant value when the energy or power transmitted by the apparatus exceeds a predetermined value, we employ a circuit 34 for energizing the actuating coil 32 of regulator 29. The circuit 34 may be energized in accordance with the load transmitted by the apparatus, such as the current of one phase of the alternating current circuit 1. A current transformer 35 may be employed for this purpose and an adjustable resistance 36 may be connected across the terminals of the current transformer 35. A rectifier 37 may be interposed between the actuating coil 32 and the circuit 34 to supply to coil 32 a unidirectional current which varies in accordance with the load transmitted by the apparatus.

If it is desired to control the conductivity of the electric valve means 4 in accordance with the voltage of one of the circuits, such as the voltage of load circuit 2, the regulator 29 may be energized in accordance with the voltage of that circuit. For this purpose a switch 38 may be used to connect the coil 32 to circuit 2. One terminal of the coil 32 may be connected to the neutral 6' of the secondary windings 6 of transformer 3 through a resistance 39, and the other terminal may be connected to the cathode 8 of electric valve means 4. The switch 38, therefore, serves as a means for selecting the type of characteristic which is to be maintained by the electric control system.

If it is desired to energize the regulator in accordance with the load current of circuit 2, a shunt 35' may be connected in series relation with the electric valve means 4, and the switch 38 may be arranged to have an additional set of contacts to energize the actuating coil 32 of regulator 29 in accordance with the direct current of the load circuit 2.

We provide a means for decreasing the conductivity of the electric valve means 4 during a starting operation of the apparatus or during the time when the apparatus is being connected to the load circuit 2. A relay or contactor 40, having an armature 41, contacts 42 and an actuating coil 43 which is spring biased to an open circuit position, is arranged to shunt the variable impedance elements 33 of the regulator 29 to control the excitation of generator 12 so that it produces a relatively large negative biasing voltage when in the closed position. When the contactor 40 is in the closed position, the regulator 29 is ineffective. Contactor 40 may be arranged to open with a time delay.

In the starting of electric valve converting systems which supply unidirectional current to a load circuit, it is sometimes desirable to close the positive and the negative contactors in sequence. For example, we provide circuit controlling means or circuit breakers 44 and 45 which are associated with the negative and positive terminals, respectively, of the direct current circuit 2. The circuit breakers 44 and 45 are arranged so that breaker 44 closes first and initiates the closure of breaker 45. Breaker 44 is provided with a pair of main contacts 46 and a bridging member 47, a pair of auxiliary contacts 48 and a bridging armature 49, and a second pair of auxiliary contacts 50 and a bridging member 51. A closing coil 52 for the breaker may be energized from any suitable source, such as a battery 53, through a switch 54. Circuit breaker 45 includes a pair of main contacts 55, a bridging member 56 and a pair of auxiliary contacts 57 and a bridging member 58. A closing coil 59 for the circuit breaker 45 is arranged to be energized from a suitable source of current such as a battery 60. The auxiliary contacts 48 of circuit breaker 44 and the auxiliary contacts 57 of circuit breaker 45 are arranged to effect energization of the actuating coil 43 of the contactor 40 when the circuit breaker 44 is in the closed circuit position and when the circuit breaker 45 is in the open position, so that the generator 12 is excited to generate a negative biasing voltage which is impressed on the control members 10 of the electric valve means 4. When circuit breaker 45 is moved to the closed circuit position, the auxiliary contacts 47 are opened and the actuating coil 43 of contactor 40 is deenergized so that the regulator 29 becomes effective.

The operation of the embodiment of our invention diagrammatically illustrated in Fig. 1 will be explained by considering the system when unidirectional current is transmitted to the load circuit 2 through the transformer 3 and the electric valve means 4. The phase of the alternating component of voltage impressed on the control members 10 is adjusted by the rotary phase shifter 18 so that it lags by a substantial angle. Adjustable resistances 26 and 27 are also positioned so that the field winding 14 may vary the terminal voltage of the generator 12 from a predetermined positive value to a predetermined negative value. Since the field windings 13 and 14 of generator 12 oppose each other, and since the field winding 13 is energized at a substantially constant value, this control may be effected by the control of the energization of winding 14.

When it is desired to connect the translating apparatus to the load circuit 2, switch 54 is moved to the closed circuit position, energizing the closing coil 52 which connects the neutral 6' of the transformer secondary windings 6 to the negative terminal of the load circuit 2. When the circuit breaker 44 is in the closed circuit position, auxiliary contacts 48 are closed by the bridging member 49, effecting energization of the actuating coil 43 of the contactor 40 through a circuit including auxiliary contacts 57 and bridging member 58 of circuit breaker 45. The variable impedance elements 33 of the regulator 29 are shunted by the contactor 40, the armature 41 of which engages contacts 42 so that the current transmitted to the field winding 14 of generator 12 is substantially increased to control the excitation of the generator 12 and thereby causing it to produce a relatively large negative biasing potential which is impressed on control members 10 of electric valve means 4. In this manner, the conductivity of the electric valve means 4 is decreased, thereby placing the apparatus in proper condition upon closure of the circuit breaker 45.

When the circuit breaker 44 closed, auxiliary contacts 50 were bridged by member 51 which effected energization of closing coil 59 of breaker 45 from battery 60. Circuit breaker 45 may be arranged to close with a predetermined time delay, thereby affording sufficient time for the contactor 40 to close. When circuit breaker 45 moves to the closed circuit position auxiliary contacts 57 are opened, effecting deenergization of the actuating coil 43 of the contactor 40. The contactor 40 may be arranged to open with a time delay so that immediately after the connection of electric valve means 4 to the load circuit 2, the conductivity of the electric valve means 4 is such that only a relatively small current will be transmitted to the load circuit 2. After a predetermined time, the contacts 42 of the contactor 40 are opened to connect the regulator 29 effectively in the circuit of field winding 14 of generator 12. It will be observed that by this control the build-up of current through the electric valve means 4 is delayed during the starting operation and that the rate at which the current builds up may be controlled.

In those applications where it is desired to obtain only overload protection, the switch 38 may be moved to the position in which it connects circuit 34 to actuating coil 32 of regulator 29. Due to the spring biasing of the armature 31 of regulator 29, the regulator 29 may be arranged so that it does not come into operation until the load transmitted by the system tends to exceed a predetermined value, at which time the regulator controls the variable impedance elements 33 to increase the current transmitted to field winding 14 of generator 12, thereby controlling the excitation of generator 12 to vary the biasing potential which is impressed on control members 10 of electric valve means 4 to maintain the current transmitted to the load circuit 2 at a substantially constant value. Of course, during this operation the biasing potential produced by the generator 12 may vary throughout its positive and negative ranges. It is to be noted that the electric valve translating apparatus responds to transmit the load required by circuit 2 within a predetermined range of operation, and when the load tends to exceed this range the system responds to maintain constant current in the load circuit 2. Within the normal range of operation when the coil 32 is connected to circuit 34, the control system may be adjusted so that the biasing potential impressed on the control members 10 is positive so that when the load tends to exceed this range the biasing potential changes to a predetermined minimum value.

The operating characteristics of Fig. 2 may now be referred to. Curve A represents the anode-cathode voltage appearing between one of the anodes 7 and the cathode 8. The distance $a$ may represent the total variation of the output voltage of generator 12 within the positive and negative ranges, and the distance $b$ may represent the positive range of the biasing potential. In like manner, the distance $c$ may represent the negative range. Curves B and C represent the control voltages impressed on the associated control member 10 under different conditions. For example, curve B represents the voltage on the control member when the resultant biasing potential is negative; and curve C represents the voltage on the control member when the biasing potential is positive. It will be noted that as the biasing potential changes from a negative value to a positive value, the voltage impressed on the control member relative to the associated anode is advanced in phase, increasing the conductivity of the associated arc discharge path and hence increasing the current transmitted to the load circuit. The associated arc discharge path, of course, is rendered conductive when the resultant control member voltage exceeds the critical voltage which is determined by the operating characteristic of the particular electric valve means employed. For example, if the electric valve means has a zero operating characteristic, that is, one in which the arc discharge is initiated when the control member and the cathode are at the same potential, arc discharges will be initiated at times $d$ and $e$.

If it is desired to employ the system to maintain the voltage of the load circuit 2 at a substantially constant value, the switch 38 may be moved to the right-hand position so that the actuating coil 32 of regulator 29 is connected across the neutral connection 6' of transformer 3 and cathode 8. By the proper adjustment of the regulator 29, the variation in energization of the coil 32 controls the current transmitted to field winding 14 of generator 12, which in turn controls the biasing potential impressed on control members 10 of electric valve means 4 to maintain the voltage at a substantially constant value. Since the field winding 14 opposes field winding 13, the biasing potential may vary throughout positive and negative ranges.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, an alternating current circuit, a load circuit, electric translating apparatus connected therebetween and including an electric valve means having a control member, switching means for connecting said translating apparatus to said load circuit, and an excitation system for energizing said control member comprising a source of voltage the polarity of which is reversible and including means responsive to the operation of said switching means for controlling said source to delay the build-up of current through said translating apparatus upon operation of said last mentioned means.

2. In combination, an alternating current circuit, a load circuit, electric translating apparatus connected therebetween and including an electric valve means having an anode, a cathode and a control member, switching means for connecting said translating apparatus to one of said first mentioned circuits, and an excitation circuit for energizing said control member comprising means for impressing thereon an alternating voltage lagging the anode-cathode voltage of said electric valve means, a source of unidirectional voltage the polarity of which is reversible and means responsive to said switching means controlling said source to delay the build-up of current through said electric valve means.

3. In combination, an alternating current circuit, a load circuit, electric translating apparatus connected therebetween and including an electric valve means having an anode, a cathode and a control member, switching means for connecting said translating apparatus to said load circuit, and an excitation system for energizing said control member comprising means for impressing on said control member an alternating voltage lagging the anode-cathode voltage of said electric valve means and a source of voltage the polarity of which is reversible to control the rate of build-up of current through said electric valve means upon closure of said switching means.

4. In combination, an alternating current circuit, a load circuit, electric translating apparatus connected therebetween and including an electric valve means having an anode, a cathode and a control member, switching means for connecting said translating apparatus to said load circuit, an excitation system for energizing said control member comprising means for impressing on said control member an alternating voltage which lags the anode-cathode voltage, a dynamo-electric machine of the direct current type having one field winding for exciting said machine to produce a negative biasing potential and having a second winding for exciting said machine to produce a positive biasing potential, means for supplying current to said windings and means for controlling the current supplied to said one winding, and means for controlling said last mentioned means to control the build-up of current through said electric valve means upon closure of said switching means.

5. In combination, an alternating current circuit, a load circuit, electric translating apparatus connected therebetween and including an electric valve means having an anode, a cathode and a control member, switching means for connecting said translating apparatus to said load circuit, an excitation system for energizing said control member comprising means for impressing on said control member an alternating voltage which lags the anode-cathode voltage, a dynamo-electric machine of the direct current type having one field winding for exciting said machine to produce a negative biasing potential and having a second winding for exciting said machine to produce a positive biasing potential, means for supplying current to said windings and a rheostatic regulator for controlling the current supplied to said one winding, and means for shunting said rheostatic regulator upon closure of said switching means to control the rate of build-up of current through said electric valve means.

6. In combination, an alternating current circuit, a direct current load circuit, electric translating apparatus connected therebetween and including an electric valve means having a control member, a pair of circuit breakers arranged to operate in sequence to connect said electric valve means to said load circuit, means responsive to the first of said circuit breakers to close for impressing a negative unidirectional biasing potential on said control member, and means responsive to the closure of the other of said circuit breakers for reducing the biasing potential.

7. In combination, an alternating current circuit, a direct current circuit having positive and negative terminals, electric translating apparatus connected therebetween and including an electric valve means having a control member, a pair of circuit breakers for connecting said apparatus to said load circuit, one of said circuit breakers being associated with the negative terminal of said load circuit and the other of said circuit breakers being associated with the positive terminal of said load circuit, means for closing the circuit breaker associated with said negative terminal, means responsive to the operation of said one of said circuit breakers for applying a negative unidirectional biasing potential to said control member to decrease the conductivity of said electric valve means, and means responsive to the operation of the other of said circuit breakers for effecting a reduction in the value of said negative biasing potential.

8. In combination, an alternating current circuit, a load circuit, electric translating apparatus connected therebetween and including an electric valve means having a control member, switching means connected between said translating apparatus and said direct current circuit, and means responsive to the operation of said switching means for impressing a biasing potential on said control member for a predetermined interval of time to control the rate of build-up of current through said electric valve means.

EARL S. JOHNSON.
JAMES R. KILANDER.
EUGENE H. REID.